US008458127B1

(12) United States Patent
Lorch, III et al.

(10) Patent No.: US 8,458,127 B1
(45) Date of Patent: Jun. 4, 2013

(54) APPLICATION DATA SYNCHRONIZATION (75) Inventors: George O. Lorch, III, Gilbert, AZ (US); Chitra Ramaswamy, North Brunswick, NJ (US); Dinesh Sinha, North Brunswick, NJ (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 313 days.

(21) Appl. No.: 11/966,005

(22) Filed: Dec. 28, 2007

(51) Int. Cl.
*G06F 17/00* (2006.01)

(52) U.S. Cl.
USPC .......... 707/617; 707/640; 707/661; 707/674; 707/781; 711/162

(58) Field of Classification Search
USPC ............... 707/204, 203, 617, 640, 661, 674, 707/781; 711/162
See application file for complete search history.

(56) References Cited

U.S. PATENT DOCUMENTS

| 5,530,855 | A | 6/1996 | Satoh et al. .................. 395/600 |
| 5,991,771 | A | 11/1999 | Falls et al. .................. 707/202 |
| 5,995,980 | A | 11/1999 | Olson et al. .................. 707/201 |
| 6,034,621 | A | 3/2000 | Kaufman ................. 340/825.44 |
| 6,308,201 | B1 | 10/2001 | Pivowar et al. .............. 709/214 |
| 6,460,124 | B1 * | 10/2002 | Kagi et al. .................. 711/163 |
| 6,601,076 | B1 | 7/2003 | McCaw et al. .............. 707/203 |
| 6,636,873 | B1 | 10/2003 | Merchant et al. ............ 707/201 |
| 6,691,245 | B1 * | 2/2004 | DeKoning ..................... 714/6 |
| 6,704,755 | B2 * | 3/2004 | Midgley et al. .............. 707/204 |
| 6,792,085 | B1 | 9/2004 | Rigaldies et al. .......... 379/88.13 |
| 6,847,983 | B2 | 1/2005 | Somalwar et al. ........... 707/203 |
| 6,941,327 | B2 | 9/2005 | Kim et al. .................. 707/204 |
| 6,983,308 | B1 | 1/2006 | Oberhaus et al. ............ 709/206 |
| 6,985,915 | B2 | 1/2006 | Somalwar et al. ........... 707/203 |
| 7,085,779 | B2 | 8/2006 | Holtz et al. ................. 707/200 |
| 7,103,617 | B2 | 9/2006 | Phatak ........................ 707/201 |
| 7,124,151 | B1 | 10/2006 | Choi ............................ 707/200 |
| 7,146,385 | B1 * | 12/2006 | Bruce .............................. 1/1 |
| 7,165,154 | B2 * | 1/2007 | Coombs et al. .............. 711/162 |
| 7,277,901 | B2 | 10/2007 | Parker et al. ................ 707/203 |
| 7,373,362 | B2 | 5/2008 | Detweiler et al. ........... 707/201 |
| 7,401,104 | B2 | 7/2008 | Shah et al. .................. 707/100 |
| 7,657,574 | B2 | 2/2010 | Gupta et al. ................. 707/201 |
| 7,685,170 | B2 | 3/2010 | Barsness et al. ............. 707/202 |
| 7,743,019 | B2 | 6/2010 | Shah et al. .................. 707/610 |
| 2002/0059299 | A1 | 5/2002 | Spaey ...................... 707/104.1 |

(Continued)

OTHER PUBLICATIONS

Office Action, U.S. Appl. No. 11/260,063, 9 pages, Oct. 23, 2007.

(Continued)

*Primary Examiner* — Dennis Truong
(74) *Attorney, Agent, or Firm* — Baker Botts L.L.P.

(57) ABSTRACT

In a particular implementation, providing a virtual cached network drive, on a client, for PST-type (Personal STore) file operations, during a non-optimal connection. In one implementation, during the non-optimal connection, changes to objects, in a local PST file, are saved in a local cache (the virtual network drive) and logged. At certain intervals, the changes are compiled, compared with entries in a synchronization database and a list of changes, to be performed on the objects, is generated which is used to update a remote PST. If the connection remains non-optimal, a temporary PST file is created, based on the list of changes, and transferred to a remote agent that performs the changes on the remote PST. If the connection improves, the changes are instead performed directly on the remote PST.

28 Claims, 9 Drawing Sheets

U.S. PATENT DOCUMENTS

| | | | | |
|---|---|---|---|---|
| 2003/0037020 | A1 | 2/2003 | Novak et al. | 707/1 |
| 2003/0101300 | A1* | 5/2003 | Goldick | 710/200 |
| 2003/0135524 | A1* | 7/2003 | Cane et al. | 707/204 |
| 2003/0158869 | A1* | 8/2003 | Micka | 707/203 |
| 2004/0054699 | A1* | 3/2004 | Bear et al. | 707/204 |
| 2005/0055382 | A1 | 3/2005 | Ferrat et al. | 707/201 |
| 2005/0182767 | A1 | 8/2005 | Shoemaker et al. | 707/10 |
| 2005/0256907 | A1 | 11/2005 | Novik et al. | 707/200 |
| 2006/0020594 | A1 | 1/2006 | Garg et al. | 707/6 |
| 2006/0190722 | A1* | 8/2006 | Sharma et al. | 713/165 |
| 2007/0027936 | A1* | 2/2007 | Stakutis et al. | 707/204 |
| 2007/0094465 | A1 | 4/2007 | Sharma et al. | 711/162 |
| 2007/0100902 | A1 | 5/2007 | Sinha | |

OTHER PUBLICATIONS

Office Action, U.S. Appl. No. 11/260,063, 10 pages, Apr. 18, 2008.
Office Action, U.S. Appl. No. 11/260,063, 10 pages, Sep. 2, 2008.
Office Action, U.S. Appl. No. 11/260,063, 15 pages, Oct. 29, 2008.
Office Action, U.S. Appl. No. 11/260,063, 16 pages, Feb. 11, 2009.
Office Action, U.S. Appl. No. 11/260,063, 15 pages, Jul. 15, 2009.
"ViceVersa File Synchronization Software lets You Synchronize Files, Data and Folders," www.tgrmn.com, http://web.archive.org/web20041022015247/http:www.tgrmn.com/web/file_synchronization.htm, 2 pages, Oct. 22, 2004.
"ViceVersa Software: File Synchronization, File Replication, File Backup, File Comparison," www.tgrmn, http//web.archive.org/web/20040806122844/http://www.tgrmn.com/web/file_replication.htm, 2 pages, Aug. 6, 2004.
"Screenshots," www.tgrmn.com, http://web.archive.org/web/20040806085616/http://www.tgrmn.com/web/screenshots/9.htm, 2 pages, Aug. 6, 2004.
"ViceVersa Software Features: File Synchronization File Replication, File Backup, File Comparison," www.tgrmn.com, http://web.archive.org/web/20041022021826/http:www.tgrmn.com/web/popup/feat_comp.htm, 3 pages, Oct. 22, 2004.
"PeerSync Introduction & Applications," peersoftware.com, http://web.archive.org/web/20031205001831/http://peersoftware.com/peersync.html, 2 pages, Dec. 5, 2003.
"PeerSync Feature Listing," peersoftware.com, http://web.archive.org/web/20030619072647/http://peersoftware.com/peersync/peersync_features_full.html, 6 pages, Jun. 19, 2003.

* cited by examiner

APPLICATION DATA SYNCHRONIZATION

TECHNICAL FIELD

The present disclosure generally relates to data backup and synchronization mechanisms.

BACKGROUND

Reliably and consistently performing data backups of mobile laptop users, typically members of an organization that desires to maintain such backups, can often be problematic. Some of those problems may include deciding a process to perform the data backup in view of not necessarily knowing where a laptop may next be connected. For example, if a connection is established between the laptop and the organization network via a non-organization network at a non-optimal connection speed to perform a backup.

Email client-related data is one example of a data-type that may be beneficial to backup. However, an email storage file can become monolithic over time and therefore make back-ups time-intensive for the user.

SUMMARY

The present invention, in particular embodiments, is directed to methods, apparatuses and systems directed to application data backup and synchronization.

In a particular implementation, providing a virtual cached network drive, on a client, for PST-type (Personal STore) file operations, during a non-optimal connection. In one implementation, during the non-optimal connection, changes to objects, in a local PST file, are saved in a local cache (the virtual network drive) and logged. At certain intervals, the changes are compiled, compared with entries in a synchronization database and a list of changes, to be performed on the objects, is generated which is used to update a remote PST. If the connection remains non-optimal, a temporary PST file is created, based on the list of changes, and transferred to a remote agent that performs the changes on the remote PST. If the connection improves, the changes are instead performed directly on the remote PST.

In another implementation, change work lists are generated for both the local and remote PSTs, when a connection becomes non-optimal. At the local PST, the lists are analyzed for changes, synchronized to generate a master change work list. If the connection remains non-optimal, a temporary PST is created and the master change work list is sent to a remote agent which performs updates on the remote PST. In turn, the remote PST returns any additions to the local PST. If the connection improves, the changes are instead performed directly on the remote PST.

The following embodiments and aspects thereof are described and illustrated in conjunction with systems, apparatuses and methods which are meant to be exemplary and illustrative, not limiting in scope. In various embodiments, one or more of the above-described problems have been reduced or eliminated. In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

FIGS. 1-2B are various block diagrams illustrating example operating environments for data synchronization and data backup performed by the present invention;

DETAILED DESCRIPTION

The following embodiments and aspects thereof are described and illustrated in conjunction with systems, apparatuses and methods which are meant to be illustrative, not limiting in scope.

The present invention, in particular embodiments, is directed to methods, apparatuses and systems directed to providing a virtual network drive, on a client, for PST-type file operations, when a connection is non-optimal or not available (i.e. offline-usage). This is accomplished, in part, by providing a file system filter driver operable to determine when a connection to a network drive, hosting a remote backup PST, becomes non-optimal. When this occurs, the file system filter driver re-directs PST file operations to a virtual network drive hosted in a local cache. When the connection improves or becomes available, the file system filter driver re-directs PST file operations back to the network drive. The file system filter driver and conditions other than connection quality, to cause the driver to switch to and from a virtual network drive, will be presented in a later section.

During the duration of the non-optimal connection, logging and analyzing of the PST file operations occurs, at certain intervals, and are utilized to generate a change work list. If the non-optimal connection persists, a temporary PST, containing information on changes to the local PST, is created and sent to a remote agent which updates the remote PST based on the temporary PST. If the connection improves, the changes are instead performed directly on the remote PST. This particular implementation of updating the remote PST may be termed as a "one-way" backup. Also, the present invention, in particular embodiments provides for a "two-way" data synchronization which will be described in more detail at a later section.

For didactic purposes, a brief review of some terms and concepts, utilized by the present invention, will first be presented. In a Microsoft® Exchange® server email system, email messages and perhaps other items are typically delivered to and stored on a server in a multi-user database, the messages being accessible via an email client application (such as Outlook®) hosted on a client computer. Personal items, such contacts and notes, are typically stored at the client computer. In contrast, non-Exchange email systems, such as POP-based email, for example, will typically store all the information in a local file at the client computer. A PST (Personal STorage) file is a storage container, created from within an email client (such as Microsoft® Outlook®), which stores e-mail, contacts, tasks and more, in a local location such as a user's laptop or a network drive. Enterprise users, with Exchange® accounts, typically use PSTs for archival purposes given that their respective email accounts usually have storage size limits. Such PST files are either typically stored on a local client or on a remote host, such as a file server. To remotely access the PST file, the folder space maintained by the file server may be accessible to the user as a so-called network drive. Given that the archive PST files may be the only container of a user's data, it may be desirable to remotely backup these PST files from the client to a remote backup system. Still further, some enterprise users may not maintain an exchange server. Accordingly, backup of PST files in an efficient manner becomes more important.

In the corporate arena, Exchange Servers are used to store email messages. The Outlook Offline Storage Folder (.OST) in Microsoft Outlook provides a synchronization method with an Exchange Server and existing mailbox accounts. This .OST file is generated by the email client application for the purpose of storing the content of the user's mailbox on the local hard drive for offline use. The OST file gets stored on a users computer system which gets synchronized with the Exchange mailbox account, resulting in duplication of data on the exchange server and on the user's system.

For purposes of description, a local PST refers to a PST file stored locally on a storage system directly attached to a computer host. A remote PST refers to a file stored on a server or other host remote from a given computer host. A PST may also be termed as "remote" if it resides on a different partition or section of a drive that hosts the local PST, on another drive on a client or perhaps an external drive locally connected, wired or wireless, to the client or other similar situations.

The present invention may also utilize Messaging Application Programming Interface (MAPI) which is a messaging architecture and a Component Object Model based API for Microsoft Windows. MAPI allows client programs to become (e-mail) messaging-enabled, -aware, or -based by calling MAPI subsystem routines that interface with certain messaging servers. Email applications use MAPI to access PST and OST files. MAPI is closely related to MAPI/RPC, the proprietary protocol that Microsoft Outlook uses to communicate with Microsoft Exchange. MAPI tends to be "chatty," however, in that it tends to use large amounts of bandwidth.

Remote procedure call (RPC) is an inter-process communication technology that allows a computer program to cause a subroutine or procedure to execute in another address space (either on the same host or, more commonly, on another computer on a shared network) without having to explicitly code the details for this remote interaction. As will be seen in a later section, an RPC is utilized in an Outlook instance as part of one implementation of the present invention.

The present invention may be embodied in a mobile data management utility, such as the Mobility® software product offered by Packeteer®, Inc. of Cupertino, Calif. Mobiliti is a software package that provides file access, data synchronization and data backup for, though not necessarily limited to, mobile computer users.

A. Network and Operating Environment

Figure 1:
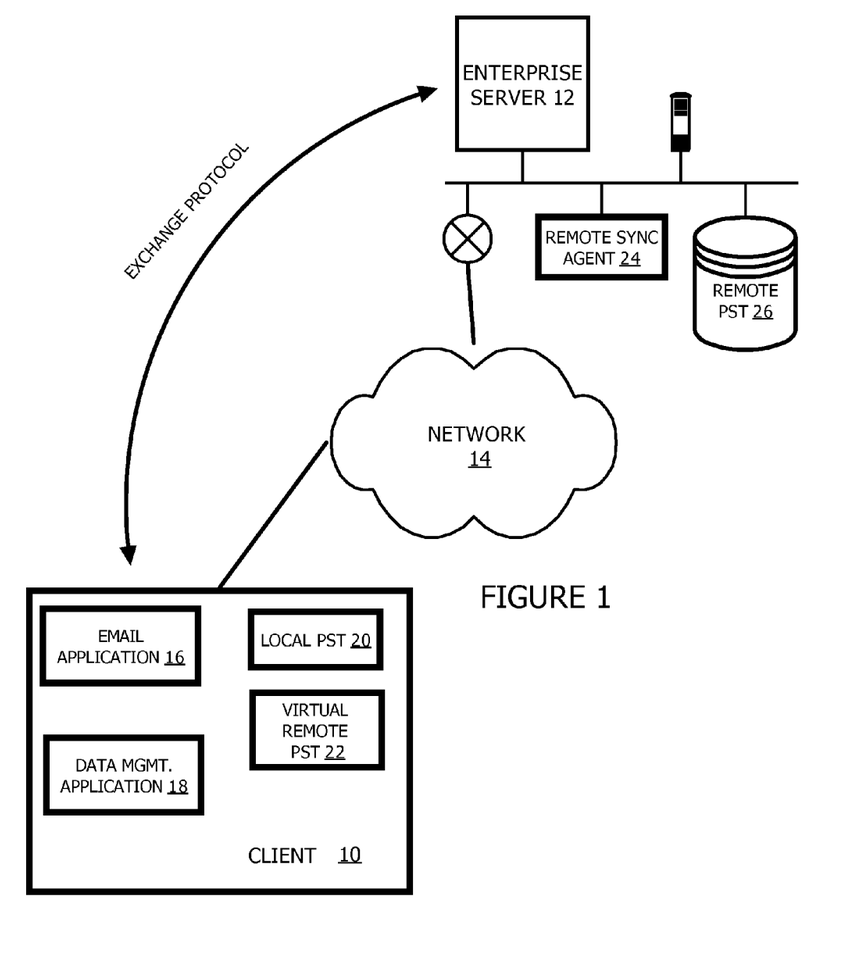
Figure 2A:
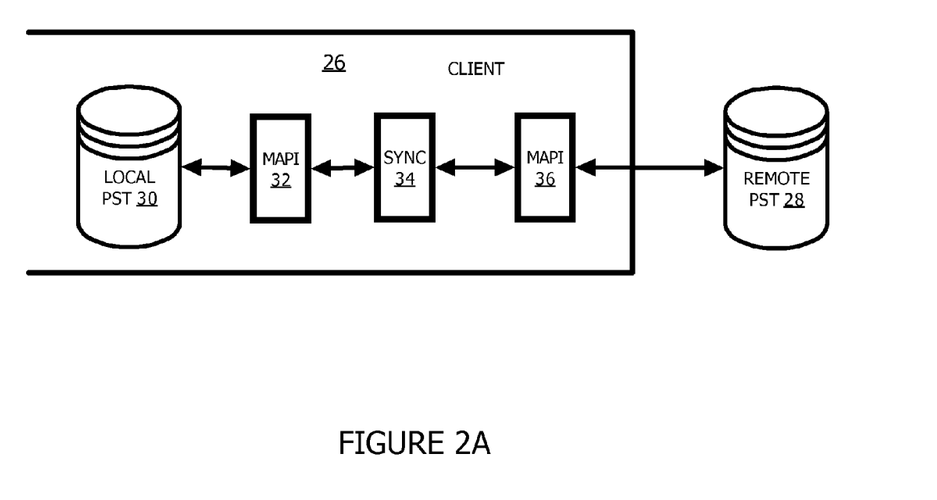
Figure 2B:
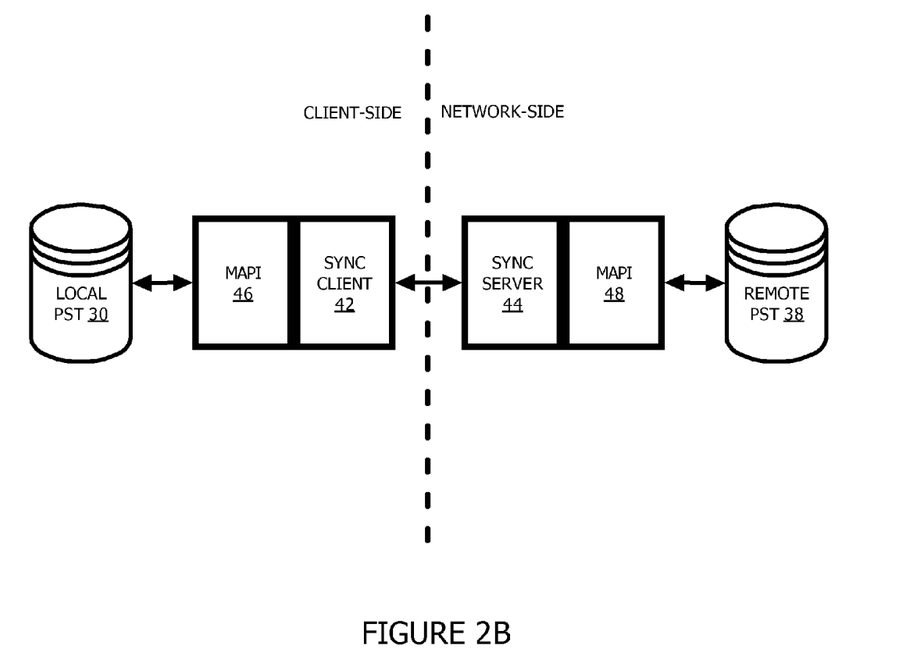

FIGS. 1-2B are various block diagrams illustrating example operating environments for data synchronization and data backup performed by the present invention. FIG. 1 is a block diagram illustrating an exchange protocol environment utilized to communicate between a client 10 and an enterprise server 12 over a network 14. Running on the client 10 is an instance of an email application 16, and a mobile data management application 18. In a particular implementation, an instance of a data access module (see FIG. 4, below) may run as a plug-in to the email application 16. Client 10 may also maintain one or more local PSTs 20 and a temp (temporary) or virtual remote PST 22. The local and temp PSTs (20, 22) are created during certain operational modes of the present invention. The mobile data management application includes a synchronization scheme that maintains a sync database which logs PST-file operations and a sync engine that can be utilized to synchronize two application data files, such as PST files. In one implementation, the sync engine can be utilized to produce change lists when the file system filter driver switches the client 10 to a locally-cached virtual network drive-mode. The change list may be utilized by a remote sync agent 24 to update remote PST 26, both typically residing on server 12.

FIGS. 2A and 2B illustrate the relationship between the synchronization engine and the local and remote PST files. As FIG. 2A shows, the synchronization engine 34 accesses the objects of the local PST 30 using MAPI layer 32, and accesses the remote PST 28 using MAPI layer 36. The synchronization functionality described herein can operate in a variety of modes and environments. For example, in one implementation, synchronization functions are hosted on one node (e.g., a client computer), as FIG. 2A illustrates. In another implementation, the synchronization functions may be split into a client-side synchronization client 42, and a server-side synchronization agent 44, as FIG. 2B shows. FIG. 2B illustrates yet another operational environment in which a remote PST 38 and a local PST 40 are connected over a network (not shown). Also included is a MAPI 46 utilized for accessing the local PST 40 by the sync client 42, as well as a MAPI 48 used for accessing the remote PST 38 by the server-side synchronization agent 42. The split synchronization mode can be advantageous as it eliminates protocol overhead of certain network file systems (such as Common Internet File System (CIFS)) associated with mounting and accessing remote files over longer latency networks to thereby increase performance.

Figure 3:
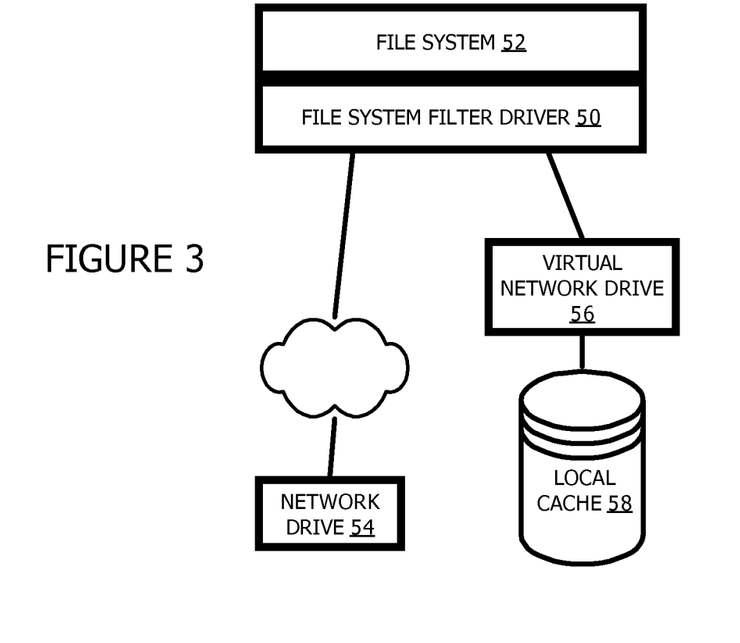
FIG. 3 is a block diagram illustrating file storage locations utilized for differing operating modes of the present invention.

As discussed above, the remote PST file 26 may be maintained on a remote file server resident on an enterprise local area network. In a particular implementation, a mobile user may maintain on or more remote PST files on a so-called network drive. In a particular implementation, the mobile data management application 18 includes functionality that, while the laptop is not connected to the local area network, emulates the network drive. FIG. 3 is a block diagram illustrating file storage locations utilized for differing operating modes of the present invention, as directed by the driver. Speaking generally, a file system filter driver 50 can be used to intercept file system commands (such as open, read and write commands) from the file system 52 directed to a network drive 54 and direct them to a virtual network drive 56. In a particular implementation, the mobile data management client 18 maintains a local copy of the network drive in a local cache 58. While the client host is not connected to the enterprise network, the file system filter driver 52 directs the file system commands to the virtual network drive 56 which processes the commands on the data stored in the local cache 58. When connectivity is re-established (or in response to a manual command or determination of improvement in connectivity), the mobile data management application 18 synchronizes the local cache 58 with the data stored on the network drive 58. Accordingly, when a user saves data to a PST, when the client host is disconnected, the data will be saved to the PST residing in the local cache 58. A subsequent synchronization will be performed between the PST file on the local cache 58 and the PST stored in the network drive 54.

There are various conditions or modes that could be set which would cause the file system filter driver 50 to re-direct remote PST file operations, when one or more of those conditions are met. For example, one mode could be based on a process which automatically decides when to switch over based on network connectivity. Another mode may be that a user manually switches over. Yet another mode may be rule-based, where the switch over is conditioned on a threshold observed data rate.

Figure 4:
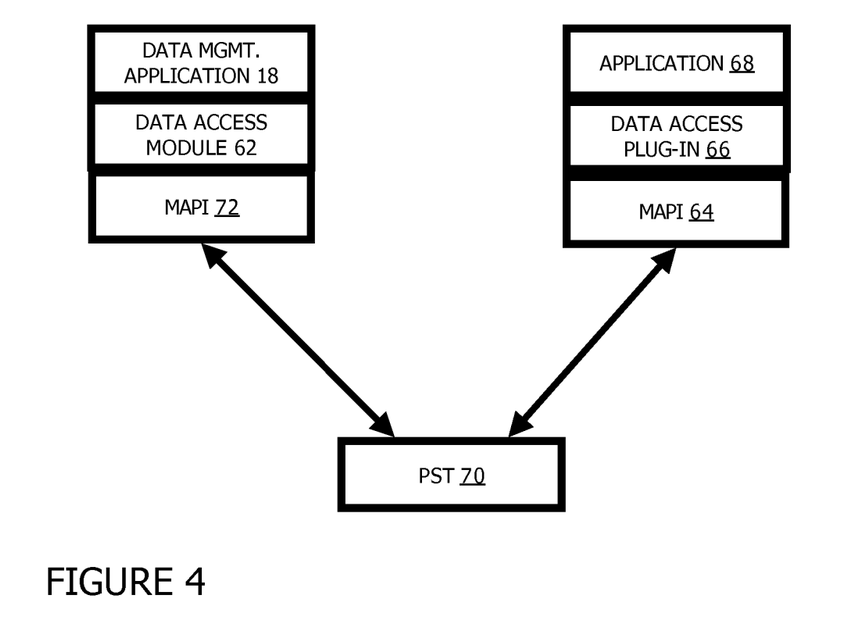
FIG. 4 is a block diagram illustrating an Outlook Mail Harmony instance and a Mobiliti Mail Harmony instance, in accordance with an example embodiment.

FIG. 4 illustrates how a PST file 70, whether local or remote, residing on a client host may be accessed. Mobile data management application 18 accesses PST file 70 via a data access module 62, which is operative to access the PST file 70 via MAPI layer 72. However, when an application 68 (such as Microsoft's Outlook®) mounts a PST file 70 it obtains a lock on the file, preventing access by other applications. Accordingly, while the application 68 has a lock on the file, data management application 18 may not obtain access to the PST file 70. To permit access, while application 68 maintains a lock on the PST file 70, a data access plug-in 66 is installed. The data access plug-in 66 is a plug-in or module to application 68, and is operative to access the PST file 70 via MAPI layer 64. The data access plug-in 66 supports an RPC channel that allows data management application 18 to access the PST file, while application 68 has a lock on it. In a particular implementation, the data management application 18 can be configured to test for accessibility to a given PST file via either the data access module 62 or the data access plug-in 66. For example, prior to a given synchronization (or a step or sub-process thereof), the data management application 18 can attempt to access the PST file 70 via data access module 62. If data access module 62 is locked out of the file, it will attempt to access via the data access plug-in 66 for the remainder of the synchronization operation or sub-process within the synchronization operation. It should be noted that while a synchronization is occurring, and an instance of application 68 is attempted to be launched, application 68 may not be able to be launched if exclusive access to the PST file 70 is not available. To prevent a delay in launching the application 68, in the situation that was just described, the synchronization may be paused to allow launch of the application 68. To accomplish this, the RPC channel, of the data access plugin 66, signals the data management application 18 to pause the synchronization until the application 68 has fully launched. Additionally, when the application 68 is closed and a synchronization is occurring, the synchronization may continue to proceed, until complete, through the instance of the application 68.

B. One-Way and Two-Way Synchronizations

The synchronization functionality described herein can perform one-way synchronizations for straight back ups, or two-way synchronizations. In a particular implementation, the synchronization functionality utilizes a local synchronization database, where metadata of the objects in a PST file, such as the local or virtual remote PST files 20, 22, are stored. The contents of the synchronization database contains information relating to the state of a given PST file at the last synchronization, such as what objects are contained in the file and their last modification times. In one implementation, file system filter driver 50 or a separate module or driver layer may also monitor file system accesses to a select set of files (such as PST files) and stores the write commands associated with these set of files in the synchronization database. From this write history, the synchronization functionality may determine what file objects have been added, changed or deleted.

Figure 7:
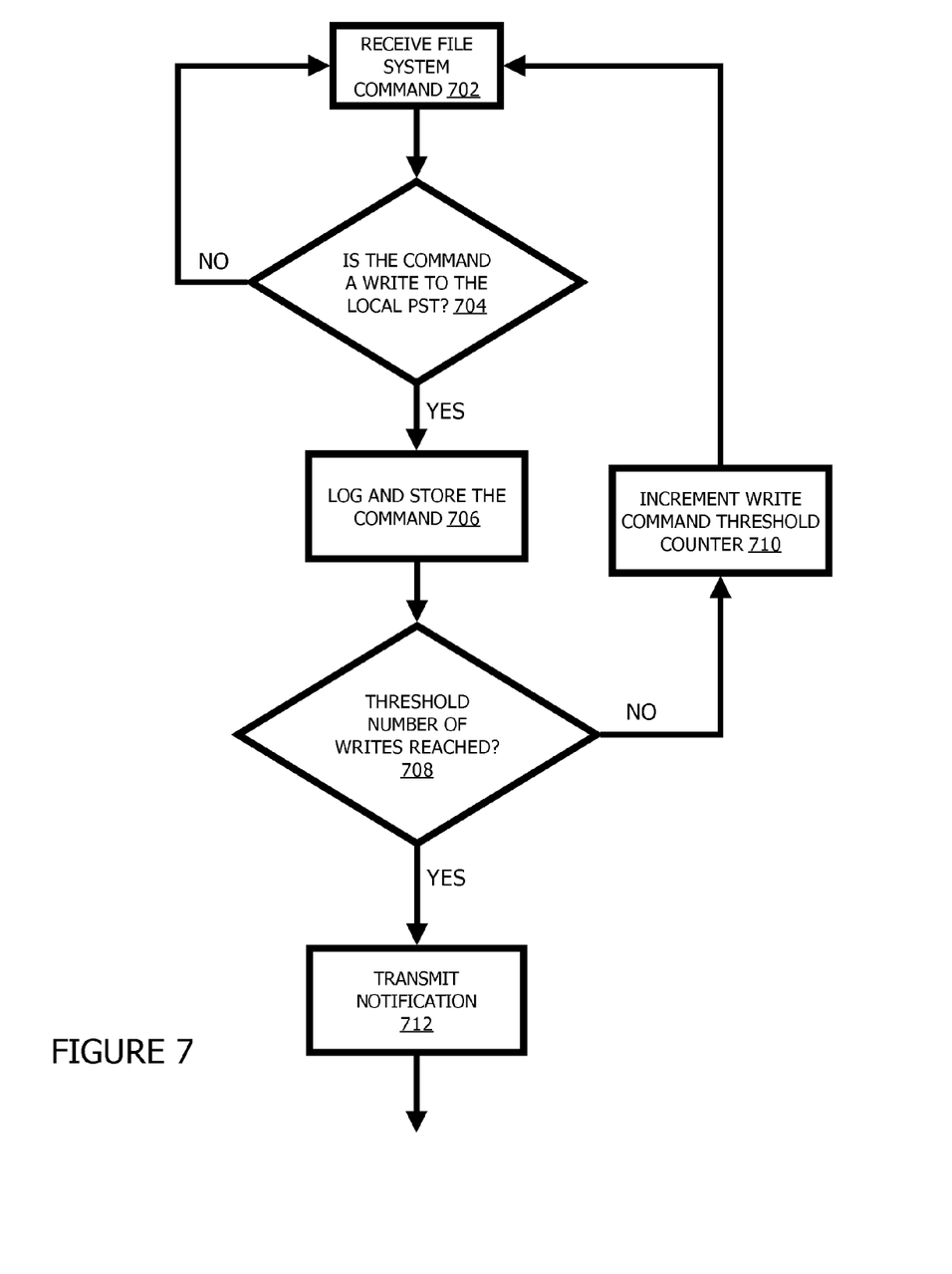
FIG. 7 is a flowchart diagram illustrating a method for initiating two-way data synchronization.

As discussed above, a synchronization can be initiated in a variety of manners—including manually and automatically. In one implementation, a triggering event can be determined by monitoring file system commands associated with one or more target PST files. Once a certain number of writes has occurred, for example, then the backup or synchronization would start. FIG. 7 illustrates such a method 700. File system filter driver 50, for example, receives a file system command (702) and determines if the received command is a write command to the local PST (704). If no, the next received command will be checked (702, 704). If the received command is a write to the local PST (704), the file system filter driver 50 logs and stores the command (706) and determines if a threshold number of writes to the local PST has been reached (708). If no, a counter is incremented (710). If yes, the file system filter driver 50 transmits a notification to mobile data management application 18 to launch a synchronization (712). Additional decisional logic, such as determining network connectivity and data rates, can also be applied as well.

B.1. One-Way Synchronization

Figure 5:
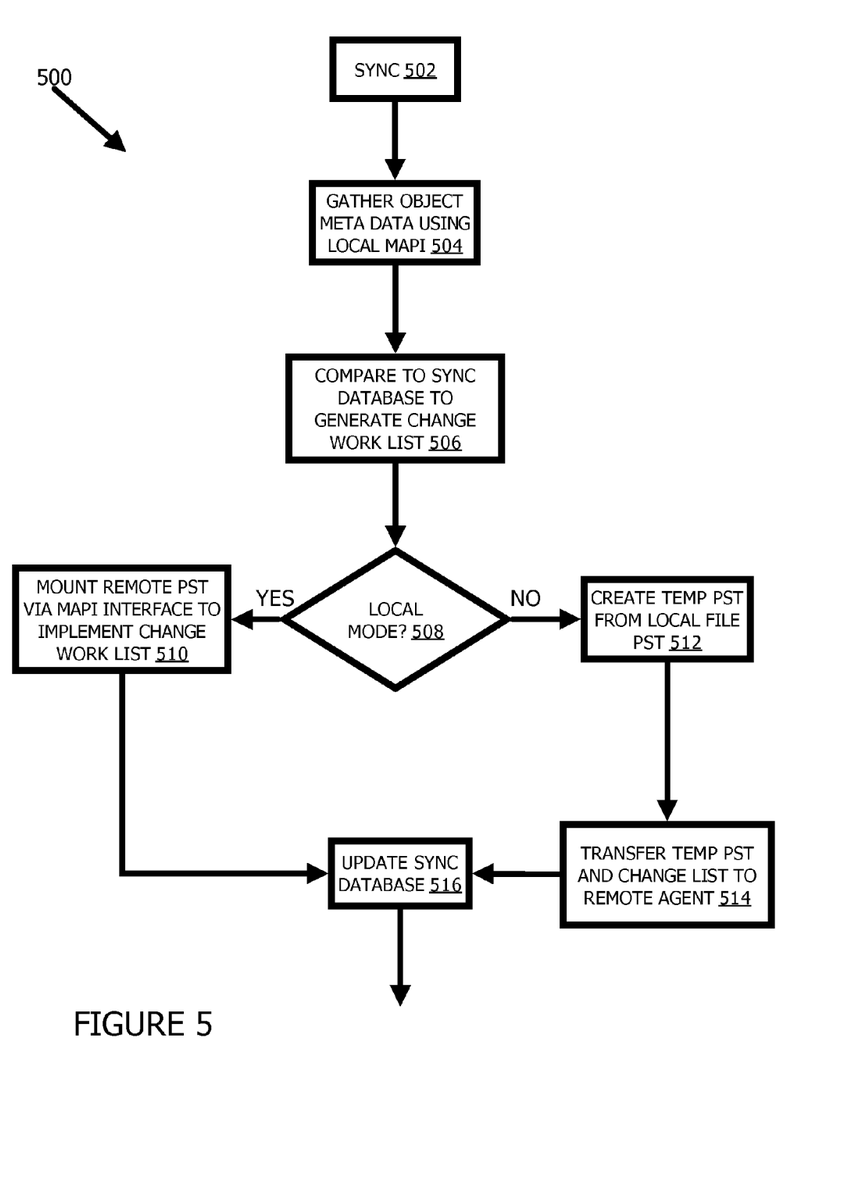
FIG. 5 is a flowchart diagram illustrating a method of one-way data backup between local PST and a remote PST, in accordance with an example embodiment.

Starting with one-way synchronizations or backups, reference is made to FIG. 5 which is a flowchart diagram illustrating a method 500 for performing said backup. When a backup is initiated (502), mobile data management application 18 accesses the PST to gathers object metadata corresponding to the data from the local PST (504). This object meta data includes the objects identified in the PST file and their last modification times. Mobile data management application 18 then compares the meta-data to the object meta-data in the synchronization database to the gathered metadata to generate a change work list (506)—a list of objects that have been added, changed or deleted since the last synchronization.

After the work list has been completed (506), mobile data management application 18 determines (508) whether it is currently configured to operate in a local synchronization mode or a split synchronization mode (508). The local synchronization mode refers to the deployment configuration, illustrated in FIG. 2A, where the synchronization engine of the client host performs the synchronization. The split synchronization mode refers to the deployment configuration, illustrated in FIG. 2B, where synchronization operations are distributed between a synchronization client 42 and a synchronization server agent 44. If the mobile data management application 18 is operating in the local mode (508), it mounts the remote PST via a MAPI interface to implement the changes to the file in the change work list (510), and updates the synchronization database to reflect the current state of the objects in the PST file (516).

If the mobile data management application 18 is operating in the split synchronization mode, it creates a temporary PST file including the objects that have been added to the local PST 20 (512), and transmits the temporary PST file and the change list to the remote synchronization server agent 44 (514). The temporary PST will typically contain objects that have been added or changed, while the change list will contain the list of added, changed and deleted objects. In an optional optimization, the mobile data management application 18 may compress the data prior to transmission. The remote synchronization server agent 44 uses this data to synchronize the remote PST file 26. Mobile data management application 18 may then update the synchronization database (516) either after transmitting this information or after receiving an acknowledgment that the remote synchronization has been executed.

The following provides a pseudo-code representation setting forth example decisional logic for creating an entry of a work change list. The pseudo-code includes a list of definitions. The definitions also apply to a two-way synchronization pseudo-code representation that will be presented in a later section.

DEFINITIONS object: An actual instance of message or folder in a local PST file.

record: A record of the existence of an object but not the object itself. Contains information such as object identification, object last modification time, object flags, etc.

local: A reference to the PST file that resides on the user's local computer.

remote: A reference to the PST file that resides on some form of disconnectable media, network or other shared or backup location (may also refer to a virtual remote PST file).

syncdb: A reference to a database that resides on the user's local computer that reflects the last known state of all of the objects in the local PST file.

One-Way Backup:
1. If there is no local record AND there is a matching syncdb record
    1.1. Then the local object has been deleted and will be removed from the remote
2. Else if there is a local record AND there is no matching sync db record
    2.1. Then the local object has been added and will be copied to the remote
3. Else if there is a local record AND there is a matching syncdb record
    3.1. If the local record timestamp indicates an error
        3.1.1. If ignoring erroneous timestamps due to a user setting
            3.1.1.1. Then assume the local object has not changed
        3.1.2. Else if assuming a change when erroneous timestamps are encountered due to a user setting
            3.1.2.1. Then assume the local object has changed and will be copied to the remote
    3.2. Else if the syncdb record timestamp indicates an error
        3.2.1. Then assume the local object has changed and will be copied to the remote
    3.3. Else if the local record timestamp is not the same as the remote record timestamp
        3.3.1. Then assume the local object has changed and will be copied to the remote
    3.4. Else if the local record flags are not the same as the syncdb record flags
        3.4.1. Then assume the local objects flags have changed and will be copied to the remote
    3.5. Else
        3.5.1. Nothing has changed Additionally, in view of the one-way backup pseudo-code, it is possible to backup from one source to multiple destinations. To facilitate this, there is typically a unique record corresponding to each destination.

Furthermore, also in view of the one-way pseudo-code, it is possible to have a list of folders/items that may be ignored from synchronization. Due to this, it is possible to prevent backup of data that does not necessarily require backup. It is also possible to backup portions of the PST file into different locations. This advantageously allows the user to prioritize the backup of different locations (by having different schedules for different folders running at different priorities). Also it is possible, in one implementation, to have content based filters to enable synchronization, for example, of email from a specific sender or perhaps by keyword.

Figure 6:
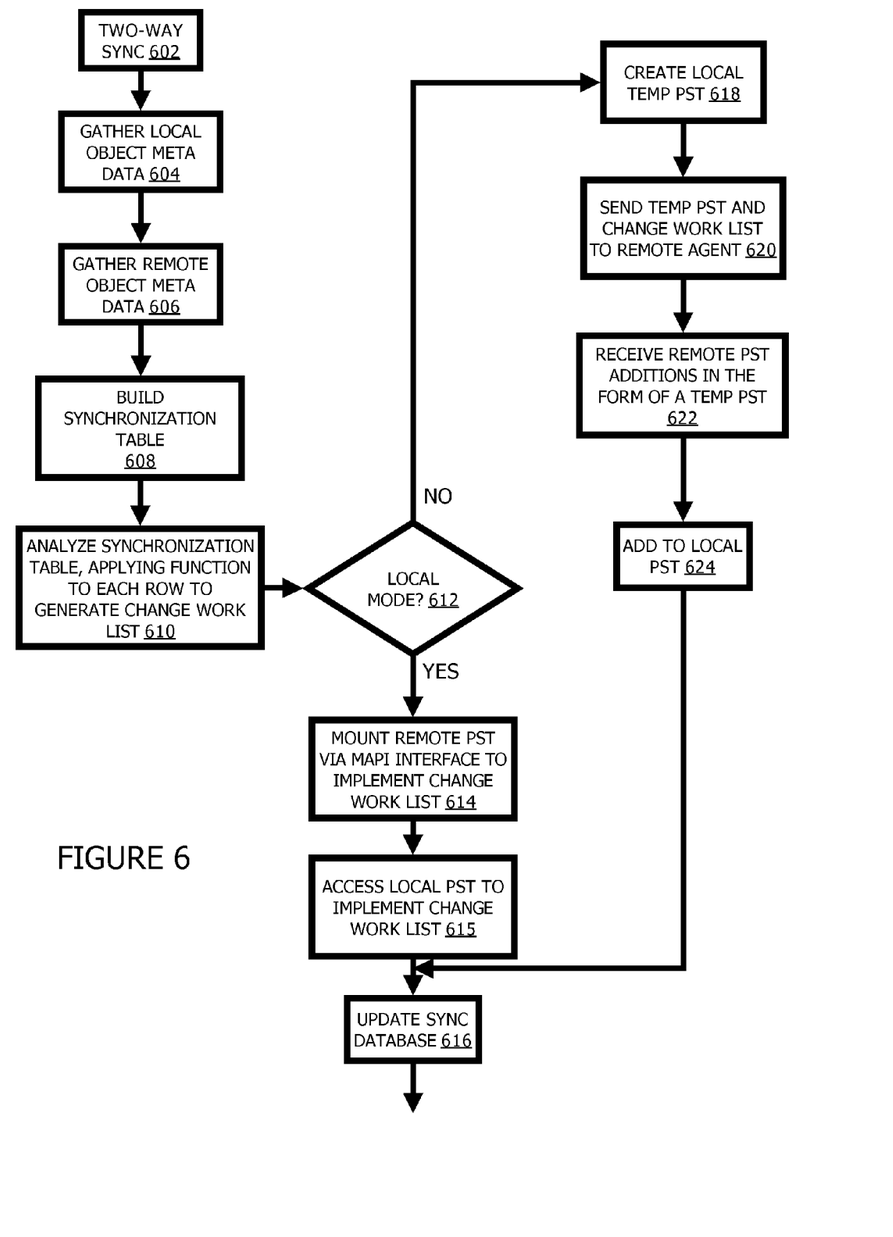
FIG. 6 is a flowchart diagram illustrating a method of two-way data synchronization between local PST and a remote PST, in accordance with an example embodiment.

FIG. 6 further illustrates a two-way synchronization implementation via a flowchart diagram of method 600. When a synchronization is initiated (602), mobile data management application 18 gathers local object meta-data (604) and also gathers remote PST object metadata (606). Gathering of remote PST object data can be accomplished by directly mounting the remote PST and gathering object metadata via the MAPI layer, if the mobile data management application 18 is in a local synchronization mode. Otherwise, mobile data management application 18 sends a command to the remote server synchronization agent 44 to obtain the remote PST object meta-data.

B.2. Two-Way Synchronization

Now that the one-way backup implementation has been described, the two-way synchronization implementation will be presented. Two-way synchronization generally involves determining discrepancies between a local PST and a remote PST since a last synchronization and applying updates as necessary to either or both PSTs. Two-way synchronization can be utilized for a group of users who share a single local PST, or a single user who uses multiple client hosts and wants to maintain a common PST among the multiple client hosts.

FIG. 6 further illustrates a two-way synchronization implementation via a flowchart diagram of method 600. When a synchronization is initiated (602), mobile data management application 18 gathers local object meta-data (604) and also gathers remote PST object metadata (606). Gathering of remote PST object data can be accomplished by directly mounting the remote PST and gathering object metadata via the MAPI layer, if the mobile data management application 18 is in a local synchronization mode. Otherwise, mobile data management application 18 sends a command to the remote server synchronization agent 44 to obtain the remote PST object meta-data.

Next, mobile data management application 18 builds a synchronization table of PST file object entries based on the local PST object metadata, the remote PST object metadata and the local synchronization database (608). Table 1 illustrates for didactic purposes a representation of an example synchronization table that may be generated. Mobile data management application 18 analyzes the row entries of the synchronization table to build change work lists for the local-to-remote direction and the remote-to-local direction (610). In one implementation, MAPI provides unique object identifiers that are used to reconcile the entries of the synchronization table. For a given row entry, the presence or absence of entries in a given column, as well as differences between time stamps of corresponding entries in a row, can indicate what entries have been deleted, changed or added. Additionally, conflicts are identified between the two lists an example of which could be an email that was modified at both PSTs.

TABLE 1

| Local PST | Sync Database | Remote PST |
| --- | --- | --- |
| Entry 1 | Entry 1 | Entry 1 |
| Entry 2 | | |
| | Entry 3 | |
| | | Entry 4 |
| Entry 5 | Entry 5 | |
| | Entry 6 | Entry 6 |

As discussed above, mobile data management application 18 may be running in a local or a split synchronization mode (612). If mobile data management application 18 is running in the local mode (612), it mounts the remote PST and implements the changes identified in the change work list in the local-to-remote direction via a MAPI layer (614), and accesses the local PST file (either by directly mounting it or accessing thru the access plug-in) implements the changes to the local PST file in the remote-to-local direction (615). Mobile data management application 18 then updates the local synchronization database to reflect the current state of the local PST file (616).

If mobile data management application 18 is executing in the split synchronization mode (612), it creates a temporary PST, based on the master change list and the local PST, to include the objects added to the local PST file 20 (618), and transmits the temporary PST and the change list to the remote server synchronization agent 44 (620). The remote server synchronization agent 44 applies the changes to the remote PST file 26, and based on the change list generates a temporary PST file including the file objects to be added to the local PST file 20. When mobile data management application 18 and receives remote PST additions (622), it adds the file objects to the local PST file 20 (624). Mobile data management application 18 then updates the local synchronization database to select the current state of the local PST (616).

The following pseudo-code sets forth decisional logic that can be applied to each row of the synchronization table to identify object deletions, additions and changes and to generate a change work list for both the local-to-remote and remote-to-local directions. As mentioned in the previous pseudo-code section for the one-way backup implementation, the listed definitions also apply to the following pseudo-code representation for the above-described two-way synchronization implementation.

Two-Way Synchronization:
1. If there is no local record AND there is no syncdb record AND there is a remote record
   1.1. Then the object has been created remotely and will be copied to the local
2. Else if there is no local record AND there is a syncdb record AND there is no remote record
   2.1. Then assume the object was deleted from both the local and remote outside of the synchronization process, remove the syncdb record
3. Else if there is no local record AND there is a syncdb record AND there is a remote record
   3.1. If the syncdb record flags are the same as the remote record flags AND (the syncdb record timestamp indicates an error OR the remote record timestamp indicates an error OR the syncdb record timestamp indicates a more recent change than the remote record)
      3.1.1. Then assume the object was deleted locally and will be deleted remotely
   3.2. Else
      3.2.1. There is conflict
4. Else if there is a local record AND there is no syncdb record AND there is no remote record
   4.1. Then the object has been created locally and will be copied to the remote
5. Else if there is a local record AND there is no syncdb record AND there is a remote record
   5.1. If the syncdb record flags are the same as the remote record flags AND (the local record timestamp indicates an error OR the remote record timestamp indicates an error OR the local record timestamp is the same as the remote record timestamp)
      5.1.1. Then assume the object has not changed between the local and remote and only the synchronization database will be updated to reflect this
   5.2. Else
      5.2.1. There is conflict
6. Else if there is a local record AND there is a syncdb record AND there is no remote record
   6.1. If the syncdb record flags are the same as the local record flags AND (the syncdb record timestamp indicates an error OR the local record timestamp indicates an error OR the syncdb record timestamp is more recent than the local record timestamp)
      6.1.1. Then assume the object was deleted remotely and will be deleted locally
   6.2. Else
      6.2.1. There is conflict
7. Else if there is a local record AND there is a syncdb record AND there is a remote record
   7.1. If the local record flags are not the same as the remote record flags
      7.1.1. If the local record flags are the same as the syncdb record flags
         7.1.1.1. If the local record timestamp indicates an error OR the remote record timestamp indicates an error OR the syncdb record timestamp indicates and error OR the local record timestamp is the same as the remote record timestamp
            7.1.1.1.1. Then the remote object flags have been changed and will be copied to the local
         7.1.1.2. Else
            7.1.1.2.1. There is a conflict
      7.1.2. Else if the remote record flags are the same as the syncdb record flags
         7.1.2.1. If the local record timestamp indicates an error OR the remote record timestamp indicates an error OR the syncdb record timestamp indicates and error OR the local record timestamp is the same as the remote record timestamp
            7.1.2.1.1. Then the local object flags have been changed and will be copied to the remote
         7.1.2.2. Else
            7.1.2.2.1. There is a conflict
      7.1.3. Else
         7.1.3.1. There is conflict in the flags
   7.2. Else if the local record flags are not the same as the syncdb record flags
      7.2.1. If the local record timestamp indicates an error OR the remote record timestamp indicates an error OR the syncdb record timestamp indicates and error OR the local record timestamp is the same as the remote record timestamp
         7.2.1.1. Then the syncdb record will be updated
      7.2.2. Else
         7.2.2.1. There is no change
   7.3. Else
      7.3.1. There is no change
   7.4. If it has been determined that nothing has changed or that the syncdb record needs updating
      7.4.1. If the local record timestamp indicates an error OR the remote record timestamp indicates an error OR the local record timestamp is not the same as the remote record timestamp
         7.4.1.1. If the local record timestamp is the same as the syncdb record timestamp
            7.4.1.1.1. If the remote record timestamp is more recent than the syncdb record timestamp
               7.4.1.1.1.1. Then assume the remote object has changed and will be copied to the local 7.4.1.1.2. Else
7.4.1.1.2.1. Then assume the local object has changed and will be copied to the remote
7.4.1.2. Else if the remote record timestamp is the same as the syncdb record timestamp
7.4.1.2.1. If the local record timestamp is more recent than the syncdb record timestamp
7.4.1.2.1.1. Then assume the local object has changed and will be copied to the remote
7.4.1.2.2. Else
7.4.1.2.2.1. Then assume that the remote object has changed and will be copied to the local
7.4.2. Else if the local record timestamp does not indicate an error AND the syncdb record timestamp indicates an error AND the remote record timestamp does not indicate an error
7.4.2.1. If the local record timestamp is more recent than the remote record timestamp
7.4.2.1.1. Then assume that the local object has changed and will be copied to the remote
7.4.2.2. Else if the remote record timestamp is more recent than the local record timestamp
7.4.2.2.1. Then assume that the remote object has changed and will be copied to the local
7.4.2.3. Else
7.4.2.3.1. The syncdb record will be updated to reflect the corrected timestamps of the local and remote records Additionally, in view of the two-way synchronization pseudo-code, instead of synchronizing between a network drive and a local drive, two-way synchronization may be performed between the local drive and an external drive, in one implementation. By doing this, a user can keep active PSTs synced on multiple PSTs. Additionally, the virtual network cache may be located on the external drive. This way the user may be mobile with the PST file (on the external drive) without syncing to the local hard disk but sync the external drive directly to the network. Preferably, for consistent behavior, it is recommended in this scenario to work in a forced cached mode, and keep the network synced using Mail Harmony® when network connectivity is available, otherwise, when network connectivity is not available, an offline mode will be utilized.

B.3. Example Synchronization Configurations

The synchronization functionality described above can be utilized in a variety of different manners. For example, the synchronization functionality can be utilized to synchronize a local PST file 20 with a remote PST file 26 directly. In another implementation, the synchronization functionality described herein can be utilized in a first synchronization phase to synchronize the local PST file 20 with a "virtual" remote PST file 22 stored in the local cache 58 in connection with the virtual network drive 56. A second synchronization process between the virtual remote PST file 22 and the remote PST file 26 can be initiated when network connectivity is established.

C. Example Computing System Architecture

Figure 8:
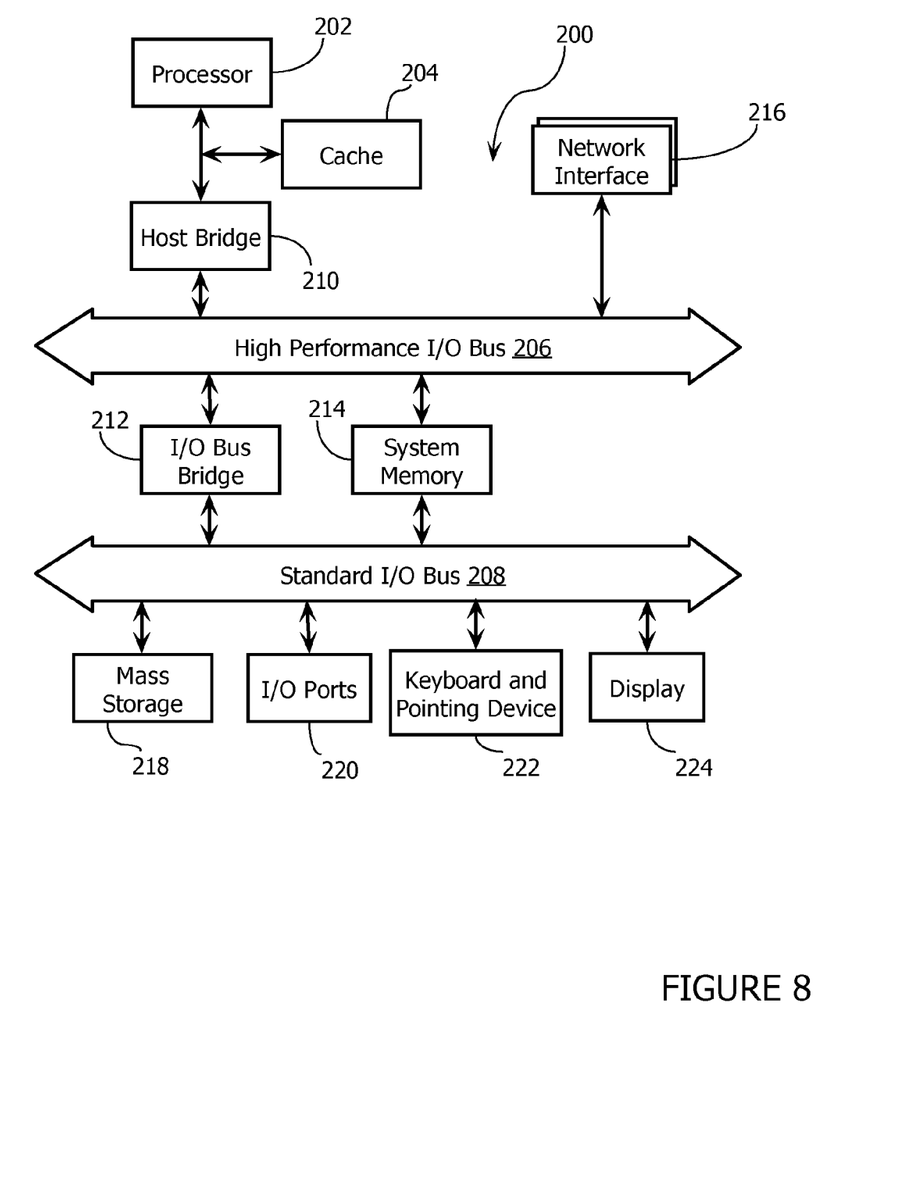
FIG. 8 is a diagram showing a high-level example system architecture that may be used to implement the present invention.

FIG. 8 is a diagram showing a high-level example system architecture that may be used to implement a client or server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. The I/O port 220 can be an RS-232 port that can accommodate the RS-232 standard mentioned in the previous section. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Linux operating system. However, the present invention may be used with other suitable operating systems, such as the Windows® 95/98/NT/XP/Vista operating system, available from Microsoft Corporation of Redmond, Wash., the Apple Macintosh Operating System, available from Apple Computer Inc. of Cupertino, Calif., UNIX operating systems, and the like.

Particular embodiments of the above-described processes might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, optical disks, magnetic disks and hard drives. The term "processing system" refers to a single processing device or a group of inter-operational processing devices. Some examples of processing devices are integrated circuits and logic circuitry. Those skilled in the art are familiar with instructions, storage media, and processing systems.

While a number of exemplary aspects and embodiments have been discussed above, those of skill in the art will recognize certain modifications, permutations, additions and sub-combinations thereof. For example, while implementations of the invention have been described as operating on a PST file, the present invention has application to synchronization and back up of other container file formats. Accordingly, it is therefore intended that the following appended claims and claims hereafter introduced are interpreted to include all such modifications, permutations, additions and sub-combinations as are within their true spirit and scope.

What is claimed is:

1. A method comprising:
   responsive to a synchronization operation identifying a first application data file, selecting, by a synchronization engine executing on a host, from a data access module operative to directly access the first application data file and a data access plug-in to an application executing on the host, wherein the data access plug-in is operative to access the first application data file via the application, wherein the data access plug-in is selected over the data access module if the application has a lock on the first application data file thereby preventing direct access to the first application data file by the data access module, the lock indicating a reservation for use by the data access module;
   responsive to the synchronization operation, determining a connection mode between the synchronization engine and a remote server;
   gathering, using the selected access method, state information relating to the first application data file; and
   synchronizing the first application data file with a second application data file based at least in part on the state information.

2. The method as recited in claim 1 wherein from the data access module and the data access plug-in is repeated for at least one operation in the synchronizing step.

3. The method as recited claim 1 wherein synchronizing based at least in part on the state information comprises comparing the gathered state information of the first application data file to a synchronization database, reflective of a previous synchronization step, to generate a change work list to be implemented on the second application data file.

4. The method as recited in claim 3 wherein determining the connection mode comprises determining the status of a connection between the synchronization engine and a network drive.

5. The method as recited in claim 4 wherein if the connection mode is a local mode then the synchronization is performed directly on the second application data file.

6. The method as recited in claim 4 wherein if the connection mode is a non-local mode then the synchronization is performed by creating a data file of changes to be performed on the second application data file and a change list detailing how to implement the changes.

7. The method as recited in claim 6 wherein a remote agent performs the changes to the second application data file based on the data file and the change list.

8. The method as recited in claim 5 further comprising updating the synchronization database based on the performed synchronization.

9. The method as recited in claim 7 further comprising updating the synchronization database based on the performed synchronization.

10. The method as recited in claim 1 further comprising gathering state information relating to the second application data file.

11. The method as recited in claim 10 further comprising building a synchronization table based on the gathered state information of the first and second application data files.

12. The method as recited in claim 11 further comprising generating a change work list from the synchronization table.

13. The method as recited in claim 12 further comprising determining a connection mode.

14. The method as recited in claim 13 wherein if the connection mode is a local mode then the synchronization is performed directly on the second application data file.

15. The method as recited in claim 12 wherein if the connection mode is a non-local mode then the synchronization is performed by creating a data file of changes to be performed on the second application data file and a change list detailing how to implement the changes.

16. The method as recited in claim 15 wherein a remote agent performs the changes to the second application data file based on the data file and the change list.

17. The method as recited in claim 16 further comprising receiving additions to the second data application data file and applying the additions to the first data application data file.

18. The method as recited in claim 14 further comprising updating the synchronization database based on the performed synchronization.

19. The method as recited in claim 15 further comprising updating the synchronization database based on the performed synchronization.

20. An apparatus comprising:
   a memory;
   one or more processors;
   computer-executable program code stored in the memory and executable by the one or more processors, the computer-executable program code comprising
      an application comprising computer-executable instructions configured to cause the one or more processors to obtain a lock on a first application data file when accessing the first application data file;
      a data access plug-in to the application comprising computer-executable instructions configured to cause the one or more processors to provide access through the application to the first application data file to a synchronization engine when the application has a lock on the first application data file;
      a data access module operative to directly access the first application data file responsive to commands of the synchronization engine;

a synchronization engine comprising computer-executable instructions configured to cause the one or more processors to responsive to a synchronization operation identifying the first application data file, select the data access module or the data access plug-in for accessing the first application data file, wherein the data access plug-in is selected over the data access module if the application has a lock on the first application data file thereby preventing direct access to the first application data file by the data access module, the lock indicating a reservation for use by the data access module;

responsive to the synchronization operation, determine a connection mode between the synchronization engine and a remote server;

gather, using the selected access method, state information relating to the first application data file; and synchronize the first application data file with a second application data file based at least in part on the state information.

21. The apparatus as recited in claim 20 wherein selecting the data access module or the data access plug-in is repeated for at least one operation in the synchronizing step.

22. The apparatus as recited claim 20 wherein synchronize based at least in part on the state information comprises compare the gathered state information of the first application data file to a synchronization database, reflective of a previous synchronization step, to generate a change work list to be implemented on the second application data file.

23. The apparatus as recited in claim 22 wherein the logic operable to determine the connection mode further comprises logic operable to determine the connection mode by determining the status of a connection between the synchronization engine and a network drive.

24. The apparatus as recited in claim 23 wherein if the connection mode is a local mode then the synchronization is performed directly on the second application data file.

25. The apparatus as recited in claim 23 wherein if the connection mode is a non-local mode then the synchronization is performed by creating a data file of changes to be performed on the second application data file and a change list detailing how to implement the changes.

26. The apparatus as recited in claim 25 wherein a remote agent performs the changes to the second application data file based on the data file and the change list.

27. The apparatus as recited in claim 24 further comprising logic operable to cause the one or more processors to update the synchronization database based on the performed synchronization.

28. The apparatus as recited in claim 27 further comprising updating the synchronization database based on the performed synchronization.

* * * * *